United States Patent [19]

Stark

[11] Patent Number: 5,426,975
[45] Date of Patent: Jun. 27, 1995

[54] METHOD AND APPARATUS FOR DETERMINING THE TOTAL FLOW RATE IN A VENTILATION INSTALLATION

[75] Inventor: Torgil Stark, Enkoping, Sweden
[73] Assignee: ABB Flakt AB, Stockholm, Sweden
[21] Appl. No.: 157,103
[22] PCT Filed: Jun. 12, 1992
[86] PCT No.: PCT/SE92/00415
    § 371 Date: Dec. 3, 1993
    § 102(e) Date: Dec. 3, 1993
[87] PCT Pub. No.: WO92/22791
    PCT Pub. Date: Dec. 23, 1992

[30] Foreign Application Priority Data

Jun. 12, 1991 [SE] Sweden ............... 9101801
Jun. 28, 1991 [SE] Sweden ............... 9102016

[51] Int. Cl.⁶ ........................... G01F 1/00
[52] U.S. Cl. ........................ 73/202; 73/202.5; 73/861.61; 73/861.62; 73/861.63; 73/861.64; 73/168; 418/118
[58] Field of Search ............ 73/202, 202.5, 861.61, 73/861.62, 861.63, 861.64, 168; 418/118

[56] References Cited

U.S. PATENT DOCUMENTS 2,342,290  2/1944  Miller ............... 73/861.65 X
2,614,423 10/1952  Carbone ............ 73/861.61
3,167,954  2/1965  May et al. ........... 73/168
3,769,835 11/1973  Obermaier et al. .... 73/202
3,930,742  1/1976  Boyce ............... 415/118 X
3,998,097 12/1976  Akashi et al. ....... 73/861.61
4,372,170  2/1983  Dehart et al. .
4,468,963  9/1984  Schauble .

FOREIGN PATENT DOCUMENTS 0419798    4/1991  European Pat. Off. .
59-131116  7/1984  Japan .
8701663   11/1988  Sweden .
WO89/02581 3/1989  WIPO .

Primary Examiner—Richard E. Chilcot, Jr.
Assistant Examiner—Jewel V. Artis
Attorney, Agent, or Firm—Young & Thompson

[57] ABSTRACT

A method and apparatus for determining the total flow rate of air flowing through a ventilation installation with a free suction fan (15) is described. The flow rate or a corresponding pressure is determined by measurement of the partial flow rate or a corresponding pressure at at least one measurement point in the vicinity of the inlet opening of the fan. A measurement tube (20) open at both ends is suitably used, and oriented with its longitudinal axis in the inflow direction, flow sensors being arranged inside the measurement tube. In this way, there is obtained good measurement accuracy within a large flow range.

11 Claims, 1 Drawing Sheet

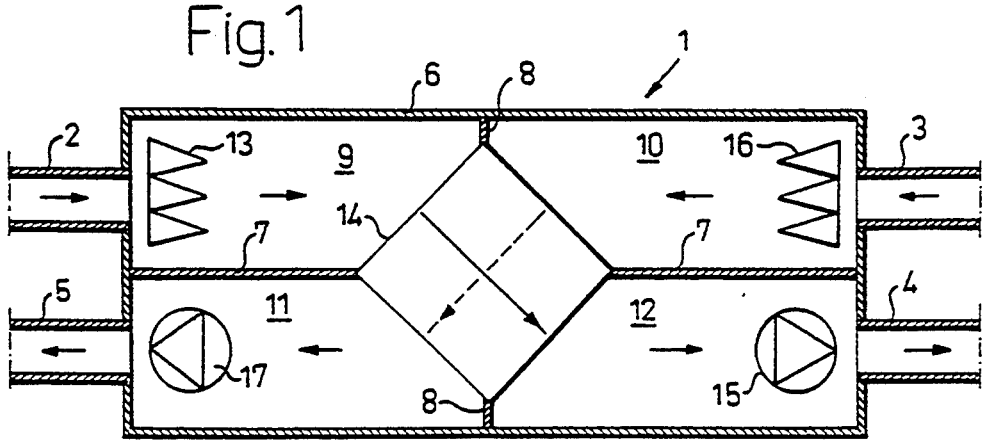
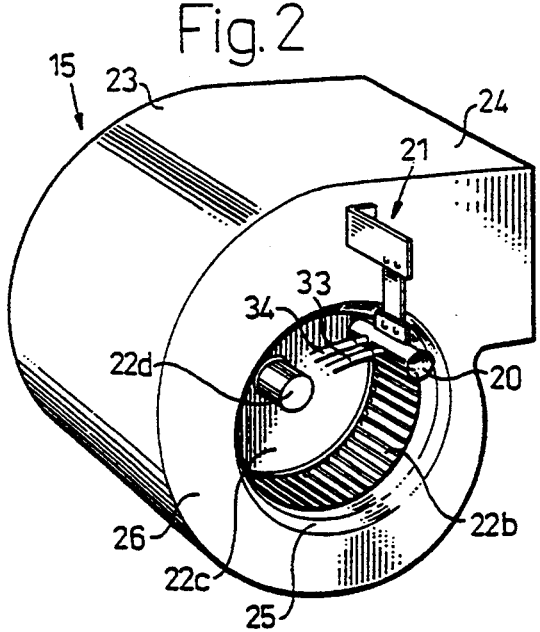
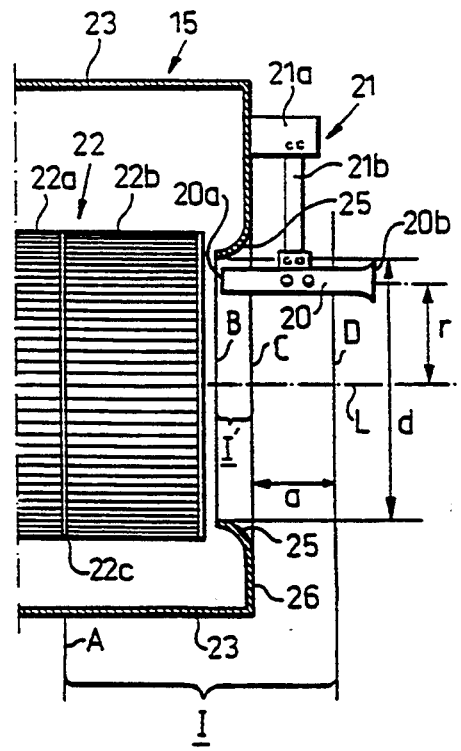
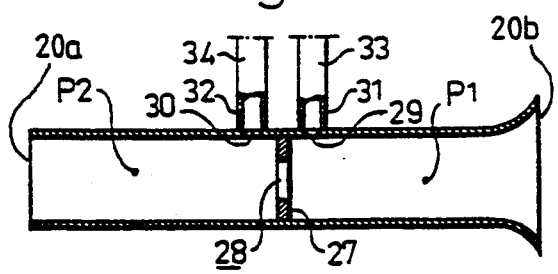

METHOD AND APPARATUS FOR DETERMINING THE TOTAL FLOW RATE IN A VENTILATION INSTALLATION

FIELD OF THE INVENTION

The invention relates to a method and apparatus for determining the total flow rate in a ventilation installation.

BACKGROUND OF THE INVENTION

According to a primary aspect, the invention more particularly relates to an installation provided with a free suction fan, the inlet(s) of the fan being at least partially defined peripherally by an annular inlet wall portion that tapers in the inlet direction, and the flow rate being-measured on the suction side of the fan in the vicinity of the inlet opening(s) thereof. Such a method, as well as an apparatus for carrying out the method is known from EP-A1-0419798 (Gebhardt Ventilatoren GmbH).

The performance of ventilation installations is dependent to an essential degree on the total flow rate. A given minimum flow rate is thus required in any ventilation installation for achieving the desired indoor climate, particularly with respect to low pollution percentages in the room air and desired room temperature by regulated supply of heat or cooling with the air.

The greater requirements made on the indoor climate, the more important it is to be able to measure, monitor and regulate the total and partial flows in the ventilation installation. If the total flow rate from a central unit decreases by 10%, the partial flows to each room will also decrease by 10%. If monitoring of the total flow rate is enabled, the partial flows in the entire ventilation installation can thus be indirectly monitored as well.

Several methods are known for flow measurement, particularly partial flows, but these methods either require an extra pressure drop with accompanying energy increase, generation of noise and increased operational costs, or they require high flow rates for achieving sufficient measurement accuracy. Such high flow rates are not normally present in ventilation ducts, and in addition there are often obstacles, e.g. in the form of bends close to the measuring point. Therefore, it is generally not possible to achieve sufficient measurement accuracy with certain simple flow meters, such as so-called Prandtl tubes (which measure dynamic pressure, i.e. the difference between total pressure and static pressure) or temperature-responsive electrical components (e.g. a resistor, the resistance of which depends on the temperature and thus also on the flow rate of the cooling air). For satisfactory measurement accuracy within a large flow range there is further required that the flow meter is placed in a straight duct section with a distance of about 5 duct diameters before and about 3 duct diameters after the measurement point.

In accordance with prior art, and as indicated above, the flow rate in a ventilation installation may be determined on the basis of pressure-drop measurements which can be made at different places in the ventilation installation, e.g. in a duct system connected to a central unit, as is proposed in the published Swedish patent application SE-A-8704163-8 (AB Bahco Ventilation). A pressure difference across a component in the duct system is measured here with the aid of pressure measurement outlets, the pressure drop across the component then being proportional to the square of the flow. The pressure measurement outlets are connected via hoses to a pressure-sensing means in a meter with a pointer for visual indication of the flow. This measurement method is however burdened with the disadvantage that comparatively poor measurement accuracy is obtained, partly due to the comperatively low flow rate in the ducts and partly due to practical installation difficulties.

Another method of flow determination is described in the Swedish patent specification SE-C-455 442 (AB Bahco Ventilation). In this case a filter in a central unit is exchanged for two perforated plates serving as constriction means, pressure sensors then being used to measure the different pressure drops which occur with the filter in place on the one hand, and the constriction plates on the other. On the basis of the flows which have already been measured with the constriction plates located in a similar unit, the flow rate is interpolated or extrapolated when the filter is in place, e.g. graphically with the aid of a diagram.

This method also gives comparatively poor measurement accuracy, and it cannot be used for continuous measurement during operation of the installation, at least not without considerable complications and work from personel.

Yet another known method is described in the published Swedish patent application SE-A-8701663-0 (Fläkt AB), the pressure drop measurement being carried out on the suction side of a suction fan in a ventilation installation.

The fan is placed in an apparatus housing and on its pressure side is connected to a duct system. A constriction means is arranged in the inlet portion of the housing on the suction side of the fan and has two pressure tappings connected to a differential pressure measurement device for determining the pressure drop and the flow rate.

The constriction means, e.g. in the form of adjustable baffles is adjustable between a completely open position and a maximum constriction position, i.e. the measurement position, which enables determination of an empirical graph of the relationship between the measured pressure difference in the measurement position and the corresponding flow rate.

This known apparatus thus requires a considerable constriction of the total flow rate during measurement while the apparatus is in operation, which results in increased need of energy, increased operational costs and disturbing noise.

Both in measurement of the total flow rate in or in connection with an air-conditioning unit (apparatus housing) and in measurement of the partial flows in ducts it has therefore been necessary to compromise energy demand and measurement accuracy. No suitable method for readily determining the total flow rate in a ventilation installation has been provided so far. An attempt has been made to measure the pressure drop in a measurement chamber provided with constrictions and situated in the outlet part of a fan (PCT/FI88/00149, publication No. W89/02581-Imaterä) but even this method has turned out to be unsuitable, due to complicated apparatus and comparatively high costs.

Attempts have also been made to measure the local flow rate in the vicinity of the inlet opening of a fan. See EP-A1-0419798 (Gebhardt Ventilation GmbH, mentioned in the opening paragraph) and JP-A-59 13 1116 (Nihon Furooseru K.K.) In both these cases, the measurement is carried out by means of a tapping hole, made in the annular inlet wall portion, and an adjoining pipe or hose for sensing the static pressure at the surface of the inlet wall portion of the fan. However, in the region closest to the surface of the inlet wall portion, the air flow is somewhat irregular and possibly subject to frictional disturbances, which depend on the exact geometrical configuration and the smoothness of the surface and the flow rate. Therefore, the static pressure measured in such a way is generally not representative of the total flow rate, in particular when using damper control of the flow at a constant rotational speed of the fan. Moreover, of course, such a method can only be used upon modifying the inside structure of ordinary fans. There is also risk of clogging of the tapping holes being freely exposed in the inlet.

SUMMARY OF THE INVENTION

Against this background, the present invention has the object of providing a method and apparatus enabling measurement of the total flow rate in a fan-driven ventilation installation without using special constriction means, which would affect the total flow rate to an essential degree, or using specially modified fans with an especially designed inlet portion and internal measurement devices, while at the same time securing reliable measurement results within a large flow range, irrespective of what disturbances or constrictions that may be present in different parts of the ventilation installation. The method and apparatus shall thus be generally useable in fan-driven ventilation installations and give good measurement results, even in existing installations by simple and inexpensive means.

Further objects are to enable reliable flow measurement with simple means to low cost, both in installation and in operation and service of the ventilation installation. In addition, it shall be possible to use the method and apparatus without the requirement of exacting work by personel, e.g. for regular supervision of the installation.

These objects are achieved in accordance with the invention by determining the total flow rate on the basis of a representative partial flow rate being measured in a stable air flow region.

The invention is based on the understanding that the inflow conditions are very stable for free suction fans, irrespective of whether it is a question of centrifugal fans (radial flow fans), axial flow fans or other types of fans, e.g. mixed flow fans. Free suction fans thus have a conical or otherwise inwardly tapering inlet wall portion, either formed as a part of a fan casing or in the form of a separate, annular element, so that the air flowing towards the fan wheel is guided smoothly into an inflow region leading directly to the fan wheel. This inflow region with particularly stable air flow is restricted radially inside and at a distance from the above-mentioned annular inlet wall portion and axially outwardly by an outer radial plane, which is located axially somewhat outside the inlet wall portion, approximately at a distance of about 30% of the least diameter of the annular inlet wall portion. In this stable inflow region, the flow pattern of the air is maintained intact irrespective of large variations in the flow rate. At the same time, the flow rate is very high in the major portion of the inflow region, which gives substantially better measurement conditions than in remaining parts of the ventilation installation connected to the fan.

The method and apparatus in accordance with the invention have been found in practical tests to give, inter alia, the following advantages:
- negligible reduction of the total flow rate (less than 1% drop of the total pressure achieved by the fan);
- simple installation, even for existing plants;
- low installation and operational costs;
- high versatility;
- very high and stable measurement values (pressure values) with advantageous, particularly square flow characteristic;
- good measurement accuracy (measurement error less than ±5%) both with damper control on the pressure or suction side of the fan (at constant rotational speed) as with rotational speed control of the fan;
- no noise generation.

The practical tests have been carried out with different fan sizes (inlet from 110 mm to 350 mm) and with different types of fan wheels (forwardly as well as backwardly angled blades on centrifugal fans), all with good results. Moreover, it appeared that various disturbances on the inlet or outlet side of the fan had no effect on the measurement results, e.g. normal belt drive arrangements or very heavy constrictions on the outlet side. A bend directly connected to the fan outlet has thus affected the measurement accuracy by merely ±0.5%

The greatest measurement pressure values are obtained if the flow measurement means is placed axially in the vicinity of the annular inlet wall portion of the fan, the flow characteristic then being practically quadratic. However, it is also possible to place the measurement means axially inside or slightly outside the region of the inlet wall portion. The characteristic is then changed to an exponential value m (according to the formula: $\Delta p = k \cdot q^m$) up to about 3 or down to about 1.7, while at the same time the measurement pressure values (or the pressure difference $\Delta p$ in pressure drop measurement, explained in more detail below) will be lower. The flow conditions are still stable, however, and consequently it is quite possible to determine the total flow rate with good accuracy after calibration.

The best results have been obtained, if a measurement tube open at both ends is placed in the immediate vicinity of the fan inlet opening, with the longitudinal axis of the tube oriented substantially in the flow direction and with the outlet end of the tube situated in the axially central portion of the stable inflow region of the fan. Measurement is then carried out by sensing of the partial flow axially through the measurement tube, this partial flow rate being substantially proportional to the total flow rate.

In this manner, there are thus ensured good measurement conditions by sensing with a special measurement tube, in which the axial flow is protected and alike for different flow rates. Also, the sensing means, e.g. the pressure tapping holes, are well protected inside the tube. In check measurements, it has been found that the partial flow rate through the measurement tube is substantially proportional to the total flow rate through the fan. The partial flow rate through the measurement tube is accordingly representative and can be utilized as a measure of the total flow rate within a large flow range, i.e. the measurement will be correct irrespective of what disturbances or constrictions that have occured in the ventilation installation.

Such a measurement tube suitably has small dimensions, and a small diameter in particular in relation to the area of the fan inlet openings, so that the total flow through the inlet opening is only affected insignificantly by the measurement tube. The diameter of the tube is preferably only a fraction, preferably at most about 1/10 of the fan inlet opening diameter, and is suitably 10–20 mm.

In the above mentioned inflow region at the fan inlet, particularly in the axially inward portion of this region, the air flow rate increases compared with the flow rate axially outside this inflow region, thus causing a greater static subpressure in the inflow region. The measurement tube is then suitably placed with its inlet end axially outside the axially central portion of the inflow area, so that a driving pressure occurs between the ends of the tube. High flow rates through the tube and extremely good measurement conditions are thus ensured.

In principle, the partial flow through the measurement tube can be measured with the aid of a flow sensor, e.g. in the form of a transducer, such as a temperature-responsive electrical component, e.g. a resistor, the operational temperature of which is an unambiguous function of the cooling effect obtained in response to the flow rate. However, even in this case, it is also possible to sense some other physical parameter which is dependent on the flow.

A practically simple method of sensing the partial flow rate through the measurement tube is to sense the air pressure with the aid of at least one pressure sensing means placed adjacent to a constriction situated inside the measurement tube and at a distance from each end. A pressure difference can here be measured between two places, one immediately upstream and the other immediately downstream of the constriction (which gives a particularly high pressure difference namely up to about 600 Pa or even higher, and thereby very good measurement accuracy) or by the difference in pressure immediately downstream of the constriction on the one hand and a reference point outside and upstream of the measurement tube on the other hand.

In the practical tests which have been made using measurement tubes of the kind described above, it has been found that the dimensions of the tube and the configuration of the constriction can vary somewhat without substantial alterations in the measurement values, i.e. the manufacturing tolerances are not critical and do not cause any great cost.

The exact positioning of the measurement tube is not critical either, and mounting it can therefore be carried out without any special, costly control arrangement.

The air flow rate is normally greater radially outside the central axis of the fan inlet opening than in the vicinity of its central axis. The measurement tube (or corresponding measurement means) is therefore suitably placed at a radial distance from this central axis, preferably at a radial distance amounting to about 20–90% of the least radius of the annular inlet wall portion.

In radial flow fans, the inflow conditions are different in the peripheral direction as a result of the normally spirally shaped expanding configuration of the fan casing. The best measurement result is obtained here if the measurement tube or corresponding measurement means is placed in the vicinity of the part of the fan inlet opening which is located substantially opposite to the fan outlet (the outlet connection of the fan casing) as seen in a peripheral direction.

Generally, the inventive concept also includes an apparatus for determining the total flow rate of air flowing through a ventilation installation, the apparatus being characterized by the combination of a flow measurement tube and a bracket for mounting the tube.

BRIEF DESCRIPTION OF THE DRAWINGS

The invention, its characterizing features and advantages will now be explained in more detail below with reference to the accompanying drawings, which illustrate a preferred embodiment example.

FIG. 1 schematically illustrates a unit in a ventilation installation, the unit including a housing in which are arranged fans, filters and a heat exchanger;

FIG. 2 is a perspective view of a fan included in the unit according to FIG. 1, the fan being provided with a measurement tube in association with its inlet opening;

FIG. 3 is an axial, partial section of the fan according to FIG. 2 with its associated measurement tube; and FIG. 4 is an axial section through the measurement tube to a larger scale.

DETAILED DESCRIPTION OF THE INVENTION

In FIG. 1 there is schematically illustrated a unit 1 with a heat exchanger and duct connections 2,3,4,5 included in a ventilation installation. The unit 1 is situated in a housing 6 with intermediate walls 7,8 so that four separate chambers 9,10,11,12 are formed. The chamber 9 is connected to the duct connection 2 for outside air and accomodates a filter 13 for filtering this air, which is caused to flow to the chamber 12 via a plate heat exchanger 14 centrally placed in the housing 6. The flow is achieved with the aid of a supply air fan 15, and the supply air is blown out by the duct connection 4 to an unillustrated duct system with supply air means (unillustrated) for supplying the supply air in a building. From similarly unillustrated exhaust air means the air is sucked out from the building via a duct system to the duct connection 3, from which this air flows through an exhaust air filter 16, the chamber 10, the plate heat exchanger 14, chamber 11 and out via the duct connection 5 by the action of an exhaust air fan 17 arranged in the chamber 11.

The described ventilation installation is conventional, and only constitutes an example. A problem present with most such equipment is to maintain, upon installation and during operation, the desired flow rates, as discussed in the introduction.

In accordance with the present invention, the total flow rate, (i.e. the supply air flow rate and/or the exhaust air flow rate) in the ventilation installation is measured with the aid of a flow meter means, preferably in the form of a special measurement tube, which is placed in immediate association with the inlet opening of a free suction fan.

In the embodiment example illustrated on the drawing (cf. FIG. 2 and FIG. 3 also), a measurement tube 20 is mounted on a bracket 21 adjacent the inlet opening of the supply air fan 15. The fan 15 is a conventional centrifugal fan with double inlets and a fan wheel 22 provided with blades and formed as a double drum. Both parts 22a,22b (FIG. 3) of the drum are connected by a common hub plate 22c in the centre of which is fixed the shaft 22d (FIG. 2) of the drive motor. A casing 23 surrounds the fan wheel 22 and forms in a manner known per se a spirally shaped, peripherally expanding outlet duct, leading to a fan outlet 24. This outlet is connected in an unillustrated manner to the duct connection 4 in FIG. 1.

On either side of the fan wheel (seen in an axial direction) the casing 23 forms an axially inwardly tapering, rounded wall portion 25 (only the right hand wall portion in FIG. 3 is visible in FIGS. 2 and 3), which radially defines an inflow region I. In an axial direction the inflow region I is defined by the lines denoted by A and D, the line D lying axially outside a line C (the radial plane through the outer end of the wall portion 25) at a distance a corresponding to 30% of the least diameter d (at the line B) of the opening.

The bracket 21 comprises an angled plate 21a fastened to the side wall 26 of the fan casing 23, with a vertically dependent holder plate 21b for carrying the measurement tube 20. If so desired, the plate 21a and/or the holder plate 21b can be adjustable for altering the position of the measurement tube 20.

The measurement tube 20 is fitted with its longitudinal axis oriented parallel to the central axis L of the inlet opening and the fan wheel 22, and has its outlet end 20a situated in the axially central portion I' (between the lines B and C) of the inflow region I relatively close to the inlet wall portion 25, and substantially opposite to (in the peripheral direction) the fan outlet 24. The inlet end 20b of the tube 20 is approximately conically expanding like a funnel. The diameter of the substantially circular-cylindrical measurement tube 20 is at most about 10% of the diameter d of the inlet opening, and the measurement tube thus takes up a very small part (about 1%) of the inlet opening area. The length of the tube is preferably 5-10 greater than its diameter.

Inside the measurement tube 20 (see FIG. 4) there is a throttle plate 27 with a central, circular through flow hole 28, the plate being inserted approximately halfway between the ends 20a, 20b. On either side of the throttle plate 27, immediately upstream and downstream of it, two small holes 29,30 are bored in the cylindrical wall of the tube for pressure measurement. Pipe studs 31,32 for-connecting hoses 33,34, cf. FIG. 2 also, are fixed round the respective holes 29,30.

When fan 15 is in operation, air is sucked in through the central inlet opening. The flow has its greatest speed in the radially outward portion of the inflow area I. The measurement tube 20 is preferably arranged in this outer portion, namely at a radial distance r from the central axis L corresponding to 50-90%, e.g. 70% of the radius (d/2) of the opening. However, when the measurement pressure is very high the measurement point can be placed closer to the central axis L, e.g. at a distance of 20-50%. The flow direction of the inflowing air coincides substantially with the longitudinal axis of the measurement tube. A small portion of the total flow flows through the measurement tube 20, and the flow rate in this partial flow is at a maximum when the measurement tube is placed in accordance with the drawing figures.

With the aid of the pressure measurement tapping holes 29,30 and via the hoses 33,34, an unillustrated differential pressure measurement device of any suitable kind can sense the pressure drop across the throttle plate 27, and with this as a basis, both the partial flow rate and the total flow rate proportional to it can be determined. The pressure drop will be relatively large since the sensed pressure upstream of the throttle plate 27 in the pressure tapping hole 31 will be somewhat greater than the static pressure at a greater distance upstream of the throttle plate 27 inside the tube, e.g. at the point P1 in FIG. 4, and the sensed pressure downstream of the throttle plate 27 in the pressure tapping hole 30 is somewhat lower than the static pressure at a greater distance downstream of the throttle plate 27 inside the tube, e.g. at the point P2 in FIG. 4. This pressure drop increase at a throttle plate inside a tube is known per se, but is particularly advantageous to utilize in connection with the present invention. Accordingly, there can be obtained very good measurement results within a large flow range.

The invention can be applied in many ways. By "free suction fan" there is intended any fan, e.g. a centrifugal fan, an axial flow or a mixed-flow fan, which has a free inlet on the suction side and which is thus not directly connected to a duct on the suction side. On the other hand, the fan can naturally be accommodated in a chamber, which in turn is connected to a duct on the suction side, as is the case in FIG. 1.

By the expression "ventilation installation" is intended any apparatus or system which is connected to the fan in question. It may be a question of a very simple arrangement, e.g. merely a free-blowing fan, or a more complicated system of ducts on both the suction and pressure sides, with associated terminal devices and other equipment.

By "inlet opening" is intended any inlet opening through which air is sucked into the fan. Centrifugal fans often have two opposing inlet openings, as in the embodiment example, and in such cases a flow measurement means can be placed adjacent one or both inlet openings. It is just as well possible, of course, to arrange more than one flow measurement means at the same inlet opening. If two or more flow measurement means are used, a mean value of the measured magnitudes can suitably be formed.

When a measurement tube is used, it does not need to be cylindrical, but may be conical and/or have an expanded portion. In addition, it can be somewhat curved or comprise different mutually connected parts with somewhat different orientation. What is essential is that the measurement tube permits the air to flow through it in such a way that the partial flow rate will be substantially proportional to the total flow rate.

Instead of mounting the measurement tube or corresponding flow measurements means on a bracket, radial holding arms arranged like spokes may be used. Alternatively, the flow measurement means in certain cases may be suspended at a shaft mounting for the fan wheel a, e.g. with belt driven fans.

The definition of the inflow region I (inside the line D in FIG. 3) has been made for practical reasons. The radial plane D does not correspond to any actual, critical threshold effect, but serves as a practical outward limit for placing the flow measurement means, e.g. the outlet end of the measurement tube, with retained measurement accuracy.

We claim:

1. Apparatus for determining the total air flow rate in a ventilation installation having a fan with a fan wheel, a fan inlet opening and a fan outlet opening, said fan outlet opening being connected to a duct system and said fan inlet opening adapted to freely suck in ambient air, and being defined by an annular inlet wall portion, which is centered around a central axis (L) and which tapers in the flow direction so as to lead in inflowing air axially and radially towards said fan wheel, said apparatus comprising a stationary flow measurement tube mounted on a bracket in said fan inlet opening, said measurement tube having an open end for sensing a representative, local air flow rate at a measuring point, which is located inside said annular inlet wall portion at a radial distance from said central axis (L), said radial distance (r) being between 20% and 90% of the least radius (d/2) of said tapering inlet wall portion, and said measurement tube having a diameter which is no more than 20% of said least radius.

2. Apparatus as claimed in claim 1, wherein said measurement tube is constructed and arranged to sense an air pressure related to said representative, local air flow rate.

3. Apparatus as claimed in claim 1, wherein said flow measurement tube is open at both ends and is placed with its longitudinal axis oriented substantially in the flow direction and with its outlet end at said measuring point, sensing means being placed inside the flow measurement tube for sensing the partial flow rate of the air flowing axially through the flow measurement tube, said partial flow rate being substantially proportional to the total flow rate.

4. Apparatus as claimed in claim 3, wherein the inlet end of said flow measurement tube is situated axially outside said annular inlet wall portion.

5. Apparatus as claimed in claim 3, further including a constriction arranged inside the flow measurement tube between its ends, with at least one pressure sensing means being placed adjacent to the constriction.

6. Apparatus as claimed in claim 5, wherein two pressure sensing means are arranged respectively immediately upstream and downstream of the constriction.

7. Apparatus as claimed in claim 6, wherein said pressure sensing means situated adjacent to the constriction comprise at least one pressure tapping hole which is in communication with a differential pressure measurement device.

8. Apparatus as claimed in claim 5, wherein said constriction comprises an annular throttle plate having a central through hole.

9. Apparatus as claimed in claim 3, wherein the flow measurement tube is cylindrical and the through hole is circular.

10. Apparatus as claimed in claim 3, wherein the inlet end portion of the flow measurement tube is flared outwardly.

11. Apparatus as claimed in claim 1, wherein said fan has a casing, and said bracket is fastened to a side wall of the fan casing.

* * * * *